Dec. 26, 1961  C. C. SEGER  3,014,493
HIGH TEMPERATURE PNEUMATIC ACTUATOR
Filed Dec. 31, 1957
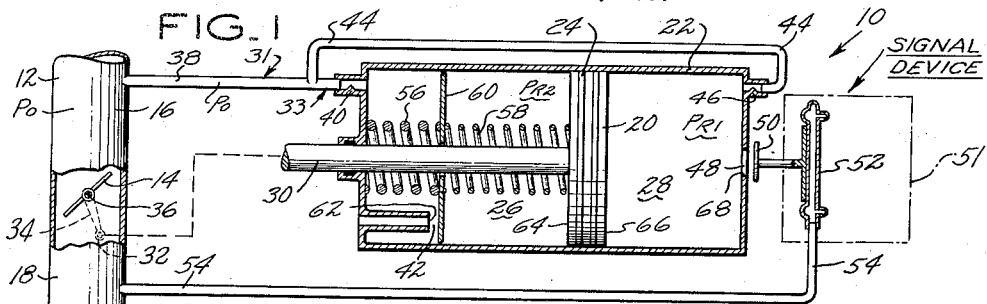
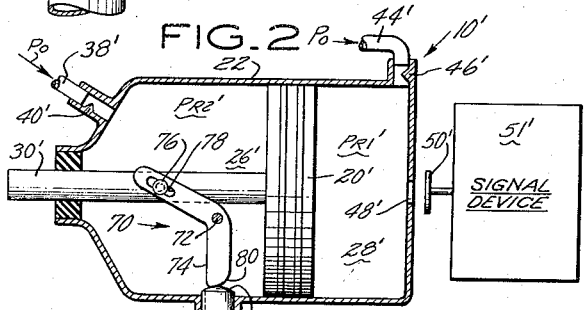
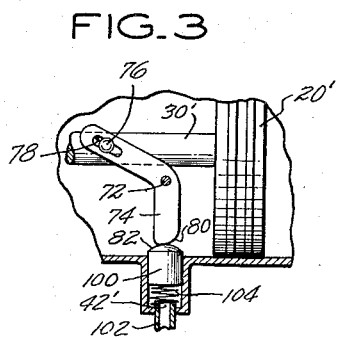
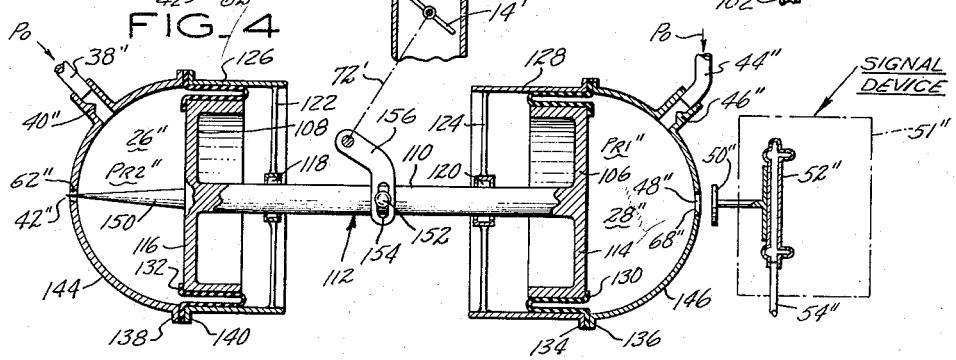
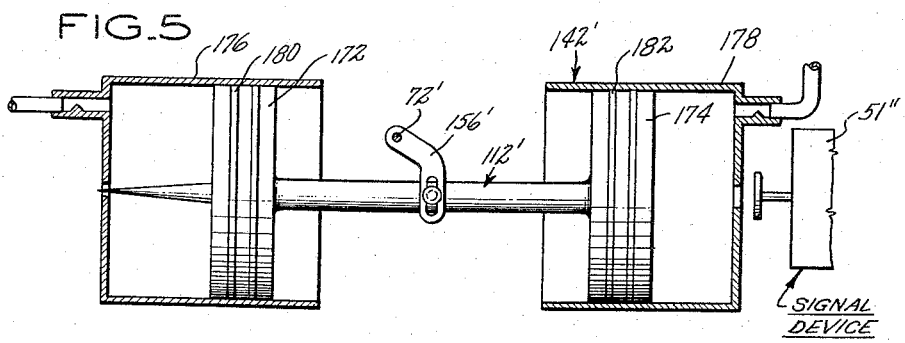
INVENTOR
CHARLES C. SEGER
BY Vernon F. Hauschild
ATTORNEY

United States Patent Office 3,014,493
Patented Dec. 26, 1961

3,014,493
HIGH TEMPERATURE PNEUMATIC ACTUATOR
Charles C. Seger, Windsor Locks, Conn., assignor to United Aircraft Corporation, East Hartford, Conn., a corporation of Delaware
Filed Dec. 31, 1957, Ser. No. 706,473
1 Claim. (Cl. 137—489)

This invention relates to actuating means and more particularly to pneumatic actuating means.

It is an object of this invention to teach pneumatic actuating means which are capable of efficient operation at high temperatures and over a wide range of actuating pressures.

It is a further object of this invention to teach a pneumatic actuator which is small in size and light in weight.

It is a further object of this invention to teach a pneumatic actuator having a pneumatic return spring which pneumatic spring has a spring rate proportional to the actuating pressure.

It is still a futrher object of this invention to teach a pneumatic actuator utilizing orifices in series on opposite sides of a movable member to establish fluid reference pressures on opposite sides of the movable member with one of the reference pressures serving as a pneumatic return spring for the movable member, and having a spring rate proportional to the reference pressure and the movement of the movable member, which movement through the cams, springs or the like varies orifice size to vary the pneumatic spring rate.

It is still a further object of this invention to teach an actuator which may be used as a pressure regulator comprising a movable member with reference pressures established on each side thereof and passing an actuating pressure through a conduit having a fixed and variable area orifice in series and varying one of the variable area orifices as a function of the pressure to be regulated or controlled so as to vary one of the reference pressures and thereby cause movable member movement which varies the other variable area orifice to vary the other reference pressure and bring the movable member into equilibrium, which movable member actuates a mechanism such as a butterfly to control pressure.

Other objects and advantages will be apparent from the following specification and claim and the attached drawings in which:

FIG. 1 shows a version of my actuator used as a pressure regulator and utilizing mechanical springs to effect a pneumatic spring.

FIG. 2 is comparable to FIG. 1 but utilizes a cam and pintle unit to effect a pneumatic spring.

FIG. 3 is a fragmentary showing of a variation of the cam unit shown in FIG. 2 but with the pintle removed.

FIG. 4 is a showing of my actuator used as a pressure regulator and utilizing at least one diaphragm as the movable member, which diaphragm directly positions a pintle within an orifice to effect a pneumatic spring.

FIG. 5 is comparable to FIG. 4 but shows metallic pistons with metal, carbon or other types of high temperature operative piston rings substituted for the diaphragms of FIG. 4 for use in a high temperature application.

While applicant chooses to show his actuator as a pressure regulator it will be obvious to those skilled in the art that it has many other applications.

Further, as used herein, the word "pneumatic" is intended to mean any gas and is not to be confined to air alone.

Referring to FIG. 1 we see our actuator unit 10 in an environment to act as a pressure regulator for the gas flow through conduit 12 to position butterfly valve 14 to control and maintain constant the pressure on downstream side at 18 of butterfly valve 14. Butterfly valve 14 is positioned on duct 12 to control the flow of fluid from the upstream side at 16 to the downstream side at 18 thereof. Actuator 10 comprises movable member 20, which is preferably a piston made of heat-resistant material such as a metal, enveloped within housing 22 and utilizing metal or carbon piston rings such as 24 to form a seal between piston 20 and housing 22 and thereby establish chambers 26 and 28 on the opposite sides of piston 20 within housing 22. Connecting rod 30 is pivotally attached at 32 to link 34 in crank fashion so that the translation of piston 20 within housing 22 causes butterfly valve 14 to pivot about point 36 and vary the area through which the gas must flow in passing from the upstream side 16 to the downstream side 18 of butterfly valve 14. The area variation varies the pressure ratio across valve 14.

Reference pressures $P_{R1}$ and $P_{R2}$ are established in chambers 28 and 26, respectively, by passing actuating fluid at pressure $P_O$ from the upstream side 16 of butterfly valve 14 through a first fluid flow conduit system 31 comprising lines 38 and 44, fixed area orifice 46, chamber 28, and variable area orifice 48 to establish reference pressure $P_{R1}$ within chamber 28 between orifices 46 and 48 and through a second fluid flow conduit system 33 comprising line 38, fixed area orifice 40, chamber 26, and variable area orifice 42 to establish reference pressure $P_{R2}$ in chamber 26 between orifices 40 and 42. When used as a pressure regulator, the area of variable area orifice 48 may be varied by any convenient means such as valve 50 which is positioned by diaphragm or bellows unit 52 which is actuated by the controlled fluid pressure from area 18 downstream of butterfly valve 14 by passing this fluid pressure through line 54. It will be obvious that when actuator 10 is used in other environments than a pressure regulator, variable area orifice 48 may be varied in any convenient fashion and as a function of any desired parameter.

Mechanical springs 56 and 58 are located in chamber 26 and on opposite sides of movable plate 60 and the spring rates of springs 56 and 58 are selected by well-known analytical means so that they cause movable plate 60 to move in response to the movement of movable member 20 a distance which is less than but proportional to the distance moved by movable member 20. Flat plate 60 is positioned by springs 56 and 58 adjacent orifice 62 so that its movement with respect thereto varies the area of variable area orifice 42. Since flat plate or second movable member 60 is moved by springs 56 and 58 a distance proportional to the distance moved by movable member 20, the area of variable area orifice 42 is caused to be varied by second movable member 60 as a function of or proportionally to the movement of first movable member or piston 20. The aforementioned movement of plate 60 to vary the area of orifice 42 proportionately to the movement of piston 20 will establish reference pressure $P_{R2}$ within chamber 26 to act as a pneumatic spring against surface 64 of piston 20 to supplement the action of springs 56 and 58 thereagainst to establish a motive force in chamber 26 acting against side 64 of piston 20, to act in opposition to the motive force in chamber 28 acting on side 66 of piston 20 and caused by reference pressure $P_{R1}$ acting thereagainst. Obviously, piston 20 is in equilibrium when the aforementioned motive forces are equal. The aforementioned pneumatic spring caused by reference pressure $P_{R2}$ acting against surface 64 of piston 20 has a pneumatic spring rate which varies as a function of actuating pressure $P_O$, thereby permitting actuator 10 to operate efficiently over a wide range of actuating pressures $P_O$. The aforementioned pneumatic spring rate may be expressed analytically as $$\frac{\Delta P_{R2} \times A_{64}}{M_{20}}$$

where $\Delta P_{R2}$ is equal to the change in reference pressure $P_{R2}$ caused by movement of piston 20 a particular distance $M_{20}$ and in which $A_{64}$ is equal to the area of surface 64 of piston 20. Since the ratio $$\frac{P_O}{P_{R2}}$$

is approximately constant when the area of orifices 40 and 42 are constant, we may substitute actuating pressure $P_O$ for reference pressure $P_{R2}$ in the formula given supra to show that the pneumatic spring rate described supra varies as a function of actuating pressure. It will be obvious by observing the formula, that the pneumatic spring rate also varies as a function of and proportionately to the amount of translation of piston 20.

By way of an example of operation, when the fluid in area 18 is at the desired pressure, actuator 10 and butterfly valve 14 are in equilibrium and stationary. Should the pressure in area 18 increase, expandable member 52 will actuate valve 50 so as to move it closer to orifice 68 and thereby reduce the area of variable area orifice 48, which causes an increase in reference pressure $P_{R1}$, thereby establishing a differential between the aforementioned motive forces acting upon the opposite sides of piston 20 to move piston 20 leftwardly. As described supra, springs 56 and 58 act in response to the movement of piston 20 to move plate 60 leftwardly a distance proportional to the distance moved by piston 20 and reduces the area of variable area orifice 42 proportionally to this leftward movement of plate 60. The reduction of area of variable area orifice 42 increases reference pressure $P_{R2}$ a sufficient amount to cause equilization of the aforementioned motive forces operating on the opposite sides of piston 20 and brings piston 20 and butterfly valve 14 to rest or equilibrium when the desired pressure in area 18 is re-established.

Referring to FIG. 2 we see an actuator 10 which is similar in all respects to the one shown in FIG. 1 but which utilizes cam and pintle unit 70 to vary the area of variable area orifice 42 as a function of and proportionally to the movement of piston 20'.

Fluid at actuating pressure $P_O$ is introduced into chamber 28' through fixed area orifice 46' and is passed therefrom through variable area orifice 48' to establish reference pressure $P_{R1'}$ therein. Fluid at reference pressure $P_O$ is also introduced through fixed orifice 40' into chamber 26' and removed therefrom through variable area orifice 42' to establish reference pressure $P_{R2'}$ and the pneumatic spring described with respect to FIG. 1 therein. As changes in the position of valve 50' vary the area of orifice 48' and hence the reference pressure $P_{R1'}$, piston 20' will move leftwardly to reposition a butterfly valve such as 14' of FIG. 4, which is carried by rotatable shaft 72 in a fashion shown in FIG. 4, which shaft is caused to rotate by crank member 74. Crank member 74 is caused to pivot with shaft 72 and about pin 76, which may be enveloped by a roller, as piston 20 translates within housing 22 to cause pin 76 to translate within slot 78 of crank 74. Crank 74 has contoured surface 80 which coacts with contoured surface 82 of member 84, which carries pintle 86 which is received in orifice 62 to vary the area of variable area orifice 42' so that the coaction of cam surfaces 80 and 82 caused by the translation of piston 20' and the rotation of crank 74 opposes the action of spring 88 to vary the area of variable area orifice 42 and hence reference pressure $P_{R2'}$. Passage 85 may be placed in member 84.

Referring to FIG. 3 we see an arrangement similar in all details to the showing in FIG. 2 excepting that the variable area orifice 42' is formed by the proximity of plunger or valve 100 with respect to conduit 102, without the aid of a pintle, as was used in the FIG. 2 configuration. In all other respects, the FIG. 3 configuration is as is shown in FIG. 2, that is, the movement of actuating piston 20' causes shaft 30' to translate and carry pin 76 therewith. Pin 76 slides in slot 78 to cause crank or arm 74 to pivot with shaft 72 to cause direct rotation of a butterfly valve such as 14 in FIG. 1 and, due to the coaction of cam surface 80 on crank 74 and cam surface 82 on plunger 100, to vary the area of variable area orifice 42. Spring 104 opposes the cam action of crank 74.

A somewhat different arrangement is shown in FIG. 4 in which diaphragms 106 and 108 are connected by shaft 110 to form movable member 112. Diaphragms 106 and 108 are composed of centrally located pistons 114 and 116, which are supported by shaft 110, which is in turn supported in any convenient fashion such as by bearings 118 and 120 which are supported by fixtures 122 and 124 from housing members 126 and 128, which may be connected. Flexible and overlapping ring-like members 130 and 132 are attached to pistons 106 and 108, respectively, and are movable therewith and are attached in stationary fashion, either by adhesive or mechanical attaching means between flanges 134 and 136, and 138 and 140, respectively. Due to the flexibility and the overlapping installation of members 130 and 132, diaphragm units 106 and 108 are capable of moving in unison as part of movable member 112 with respect to stationary member 142 would comprise housing 144, 126, 128 and 146, supports 122 and 124 and bearings 118 and 120 and the various orifices described in FIG. 1. In FIG. 4, when this configuration is used as a pressure regulator of the type fully described in FIG. 1, upstream or actuating pressure $P_O$ from line 44" passes through fixed area orifice 46" into chamber 28" to establish reference pressure $P_{R1''}$ therein and thence through variable area orifice 48", the area of which is determined by the position of valve 50" with respect to orifice 68". Valve 50" is positioned by signal device 51" which receives the downstream pressure through line 54" in a diaphragm or bellows unit 52".

At the opposite end of the FIG. 4 configuration, upstream pressure $P_O$ from line 38" passes through fixed orifices 40" and enters chamber 26" to establish reference pressure $P_{R2}$" therein and thence is discharged therefrom through variable area orifice 42", the area of which is determined by the relative position of pintle 150, which is carried by diaphragm unit 108, with respect to orifice 62". Shaft 110 carries pin 152 which is received in and coacts with slot 154 of crank 156 which is connected to and pivots with rod 72' to cause butterfly valve 14' to pivot within conduit 12'. In all other respects the FIG. 4 configuration operates in the fashion already described with respect to the FIG. 1 and FIG. 2 configurations, to establish a reference pressure $P_{R1}$" in chamber 28" to move movable member 112, the movement of which reduces the area of variable area orifice 42" to establish as a pneumatic spring reference pressure $P_{R2}$" within chamber 26" to place movable member in equilibrium when the desired controlled pressure (18) has been re-established.

As the FIG. 4 configuration includes flexible members 130 and 132, such a unit might not be adaptable for high temperature uses and therefore FIG. 5 is included to show an actuator configuration which is similar in all respects to the FIG. 4 configuration excepting that metallic, carbon or other high temperature operating pistons 172 and 174 are received within cylindrical housings 176 and 178 of stationary member 142′, with piston ring type of seals 180 and 182 sealing therebetween so that piston members 172 and 174 are substituted in movable member 112′ for diaphragm members 106 and 108 of the FIG. 4 configuration. At least one seal 180 or 182 is used with each piston, 172 or 174. In all other respects the description already given for the previous configurations is applicable to the FIG. 5 configuration.

It is to be understood that the invention is not limited to the specific embodiment herein illustrated and described but may be used in other ways without departure from its spirit as defined by the following claim.

I claim:

Pressure regulating means to maintain the pressure of a first fluid pressure source constant comprising a second fluid pressure source, pressure control means operatively communicating with said first and second fluid pressure sources and actuatable to vary the pressure of said first fluid pressure source, fluid actuating means comprising a movable member connected to and actuating said pressure control means, means establishing a first substantially constant fluid pressure on one side of said movable member and hence a first substantially constant motive force thereagainst comprising conduit means having a first fixed area orifice and a first variable area orifice in series and with fluid from said second fluid pressure source passing therethrough, means establishing a variable fluid pressure on the opposite side of said movable member and hence a variable motive force thereagainst comprising conduit means having a second fixed area orifice and a second variable area orifice in series and with fluid from said second fluid pressure source passing therethrough, means responsive to pressure changes in said first fluid pressure source varying the area of said first variable area orifice and hence said first substantially constant fluid pressure to a second substantially constant fluid pressure and said first motive force to a second substantially constant motive force to establish a first fluid pressure corrective force differential between said second substantially constant motive force and said variable motive force proportional to the error in said first fluid pressure source to move said movable member and actuate said pressure control means to correct the said first fluid pressure source error, and means responsive to the movement of said movable member to establish the area of said second variable area orifice as a function of said movable member solely and to vary the area of said second variable area orifice proportionally to the movement of said movable member and hence said second fluid pressure proportionally to the movement of said movable member and variations in said second fluid pressure source to equalize said first and second motive forces and bring said movable member and said pressure control means to equilibrium when the said first fluid pressure source error has been corrected.

References Cited in the file of this patent

UNITED STATES PATENTS

| | | |
|---|---|---|
| 2,117,182 | Lewis | May 10, 1938 |
| 2,220,180 | Spitzglass et al. | Nov. 5, 1940 |
| 2,396,951 | Horstmann | Mar. 19, 1946 |
| 2,683,348 | Petry | July 13, 1954 |
| 2,812,774 | Anderson | Nov. 12, 1957 |
| 2,966,141 | Corbett | Dec. 27, 1960 |

FOREIGN PATENTS

| | | |
|---|---|---|
| 278,689 | Germany | Oct. 2, 1914 |
| 391,328 | Germany | Mar. 3, 1924 |
| 295,290 | Great Britain | Oct. 31, 1929 |